United States Patent [19]
Scarpa

[11] Patent Number: 5,444,743
[45] Date of Patent: Aug. 22, 1995

[54] SYNCHRONOUS PULSE GENERATOR

[75] Inventor: Carl G. Scarpa, Edison, N.J.

[73] Assignee: Hitachi America, Ltd., Tarrytown, N.Y.

[21] Appl. No.: 154,849

[22] Filed: Nov. 18, 1993

[51] Int. Cl.⁶ .............................................. H04L 7/00
[52] U.S. Cl. .................................... 375/368; 375/354; 370/100.1
[58] Field of Search ............... 375/116, 114, 106, 108, 375/110, 121; 370/100.1, 105.4, 106

[56] References Cited

U.S. PATENT DOCUMENTS

| | | | |
|---|---|---|---|
| 3,646,269 | 2/1972 | Fudemoto et al. | 178/69.5 R |
| 3,668,315 | 6/1972 | Heitzman | 178/69.5 R |
| 3,760,355 | 9/1973 | Bruckert | 375/116 |
| 4,059,812 | 11/1977 | Procter | 331/1 |
| 4,352,192 | 9/1982 | Perez et al. | 375/56 |
| 4,359,770 | 11/1982 | Suzuka | 370/105.4 |
| 4,596,025 | 6/1986 | Satoh | 375/107 |
| 4,630,267 | 12/1986 | Costes et al. | 370/104 |
| 5,014,272 | 5/1991 | Yoshida | 370/106 |
| 5,018,140 | 5/1991 | Lee et al. | 370/105 |
| 5,058,106 | 10/1991 | Cole | 370/47 |
| 5,101,401 | 3/1992 | Suzuki et al. | 370/106 |
| 5,140,618 | 8/1992 | Kinoshita et al. | 375/116 |
| 5,151,925 | 9/1992 | Gelin et al. | 375/82 |
| 5,162,910 | 11/1992 | Willis | 370/106 |
| 5,163,069 | 11/1992 | Hayashi | 375/108 |
| 5,212,690 | 5/1993 | Low | 370/108 |
| 5,267,267 | 11/1993 | Kazawa et al. | 375/116 |

OTHER PUBLICATIONS

Feher, "Digital Communications: Satellite/Earth Station Engineering", Prentice–Hall, Inc., pp. 336–350 and 375–390 (©1983).

Primary Examiner—Edward L. Coles, Sr.
Assistant Examiner—Madeleine Nguyen
Attorney, Agent, or Firm—Peter L. Michaelson

[57] ABSTRACT

A synchronous pulse generator (100) for producing synchronization pulses that are synchronized with a preamble pattern contained in an input digital data signal. The generator contains a correlator circuit (102), a pulse generator circuit (106) and a flywheel circuit (104). The correlator circuit is an M-bit out of N-bit preamble correlator which periodically generates timing pulses whenever M-bits in a received preamble match M-bits in an N-bit preamble pattern. The pulse generator circuit periodically generates a synchronization pulse at a rate equivalent to an expected rate of occurrence of the preambles. The flywheel circuit monitors the occurrence of the timing pulses from the correlator circuit relative to the synchronization pulse occurrences from the pulse generator circuit. Furthermore, the flywheel circuit resets the pulse generator circuit when the timing pulses are not synchronized with the synchronization pulses for a pre-defined period of time. As such, when necessary, the flywheel circuit facilitates re-synchronization of the synchronization pulses to the timing pulses. Additionally, during transient losses of timing pulses, the flywheel circuit facilitates production of a continuous stream of synchronization pulses. The flywheel circuit and correlator circuit are programmable such that their operational parameters can be set and then dynamically altered during operation of the synchronous pulse generator.

38 Claims, 2 Drawing Sheets

SYNCHRONOUS PULSE GENERATOR

BACKGROUND OF THE DISCLOSURE

1. Field of the Invention

The invention relates to pulse generation circuits and, more particularly, to pulse generation circuits having output pulses that are synchronized to a reference signal.

2. Description of the Prior Art

There are many applications for pulse generation circuits that generate output pulses that are synchronized to a reference signal. Typical applications for such circuits include digital data communications systems and digital data recording systems. For example, many digital communications systems transmit digital data in discrete "packets" or "bursts" that are serially arranged in groups to form transmission frames. Use of such frames allows for utilization of conventional time division multiple access (TDMA) techniques to transmit the bursts between users of the communications system. Examples of such communications systems include satellite communications systems, packet radio systems, local area network (LAN) systems and the like. A receiver of such burst transmissions must periodically receive an accurate timing synchronization pulse to indicate the beginning of each frame of bursts. Using this synchronization pulse, a receiver can de-multiplex and demodulate the bursts within each frame.

Additionally, many digital communication systems, such as high definition television (HDTV) broadcasts, transmit interleaved data to promote robust transmission characteristics. To permit the interleaved data to be de-interleaved within an HDTV receiver, the receiver generates periodic timing synchronization pulses from the data. Such timing synchronization pulses mark the beginning of an interleaved data set, i.e., a block of digital data having its bits interleaved with one another. Each synchronization pulse provides a reference location within the transmission from which the interleaved data is de-interleaved in a conventional manner.

Also, there are many systems other than communications systems, e.g., digital video tape recorders and digital audio tape recorders, that record data using interleaving techniques. Consequently, to facilitate de-interleaving of the recorded data, these recorders generate, during playback, timing synchronization pulses from the recorded data. As with the communications system, the synchronization pulses indicate the beginning of each interleaved data set.

The pulse generation circuits used to generate synchronization pulses in both communication systems and non-communication systems are substantially similar. Therefore, for simplicity, the remaining discussion will address pulse generation circuits in the context of those used in communications systems.

Typically and with respect to communications, a synchronization pulse is transmitted as a "preamble" appended to either a frame or an interleaved data set. Such a preamble is typically a fixed pattern of bits (preamble pattern) that are periodically transmitted at the beginning of each frame or interleaved data set. As the receiver of the transmission receives the data bits carried by the transmission, circuitry in the receiver searches all these received bits to determine a match between the received bits and the preamble pattern. This circuitry is known as a preamble correlator. Whenever a match occurs between the received data bits and a preamble pattern stored in the preamble correlator, the correlator generates a synchronization pulse. This synchronization pulse marks the beginning of an interleaved data set or a transmission frame. Using this synchronization pulse, a conventional de-interleaver circuit de-interleaves the data or a conventional de-multiplexing circuit facilitates appropriate demodulation of the bursts within a frame.

More specifically, to produce a synchronization pulse, most conventional preamble correlators typically must match every bit in a received preamble to the stored preamble pattern. However, in some correlators, to produce a synchronization pulse, only M-bits in the received preamble need match M out of N-bits in the preamble pattern. In such correlators, each matching pair of bits is assigned a value of one; each non-matching pair of bits is assigned a value of zero. The assigned values are then summed to form a summation value. If the summation value is greater than a pre-established threshold value, i.e., a value equivalent to a match of M bits, the correlator generates a synchronization pulse. On the other hand, if the summation value does not exceed the threshold, the correlator does not produce a pulse. In this manner, the correlator produces a synchronization pulse for each instance that M-bits in the received preamble match M out of N-bits in the stored preamble pattern.

In practice, due to a number of factors, correlators, at times, generate errant synchronization pulses (false positive correlations) and, also, miss the occurrence of a preamble in the digital data (false negative correlations). A correlator generates false positive correlations when either payload data within a frame contains a sequence of bits that match the preamble pattern or when channel noise correlates with the stored preamble pattern. Moreover, a correlator produces false negative correlations when the channel noise masks the preamble bits to an extent that the correlator does not recognize an occurrence of the preamble pattern within the digital data. Consequently, such false positive and false negative correlations cause the synchronization pulses to be aperiodic and, as such, can be detrimental to the operation of de-multiplexing and de-interleaving circuits that utilize the synchronization pulses.

To alleviate the impact of false or missing synchronization pulses upon the demodulation circuitry (including de-interleaver circuits, de-multiplexing circuits and any other circuits within the receiver that utilize the synchronization pulses), many synchronization pulse generators contain so-called flywheel circuits. These flywheel circuits produce synchronization pulses at locations where a pulse should be located even though the preamble correlator has not generated such a pulse. In other words, from previous periodic occurrences of the synchronization pulses, the flywheel circuit extrapolates the position by the correlator. The flywheel circuit then generates a synchronization pulse at that position to replace the missing pulse. Transient reduction of signal strength due to multipath or excessive noise conditions, is typically responsible for the temporary loss or drop-out of synchronization pulses, i.e., false negative correlations. Therefore, by using flywheel circuits to replace the missing pulses, these transient pulse losses do not appreciably effect the performance of demodulator circuits within the receiver.

Additionally, flywheel circuits are typically designed to ignore the intermittent occurrence of false positive correlations that produce synchronization pulses between accurate synchronization pulses. Such flywheel circuits typically only accept as accurate the synchronization pulses that occur at a specific, periodic time interval, i.e., at an interval equivalent to that of the preamble occurrences in the received transmission. All other occurrences of synchronization pulses, i.e., all false positive correlations, are ignored by the flywheel circuit and, as such, do not appreciably effect the pulse production by the flywheel circuit.

One such flywheel circuit is disclosed in U.S. Pat. No 5,058,106 (issued Oct. 15, 1991 to G. B. Cole— the '106 Cole patent). This patent teaches using discrete digital components to form a flywheel circuit that generates synchronization pulses or strobes. These strobes are used for time slot synchronization in a TDMA digital communications system. The flywheel circuit synchronizes to nominally periodic input synchronization pulses generated by a correlator and produces replacement synchronization strobes during drop-outs of the input synchronization pulses. While synchronized, all aperiodic input synchronization pulses, i.e., false positive correlations, are ignored by the flywheel circuit. After a specific time interval during which no input synchronization pulses are synchronized to the replacement strobes, the flywheel circuit re-synchronizes to the input synchronization pulses. The circuit taught in the '106 Cole patent is "hardwired" to have pre-set operational parameters. These parameters include: (1) the number of input synchronization pulses that must be missing before the circuit attempts to re-synchronize, (2) the number of input synchronization pulses that must be missing before the circuit ceases producing replacement synchronization strobes, and (3) the number of input synchronization pulses that must periodically occur before re-synchronization is complete. Each of these parameters is controlled by a specific number of flip-flop circuits used to implement the circuit. Thus, if the parameters must be altered or a different application for the circuit is found that requires slightly different parameters, complete redesign of the flywheel circuit is necessary. Additionally, implementation of this flywheel circuit using discrete flip-flop circuits is complex and costly.

Another flywheel circuit is disclosed in U.S. Pat. No. 4,059,812 (issued Nov. 22, 1977 to S. A. Procter— the '812 Procter patent). This patent teaches a flywheel circuit that includes a conventional analog tank circuit. The tank circuit is connected to a preamble correlator which supplies nominally periodic input synchronization pulses. The tank circuit is designed to resonate (oscillate) at the frequency of these periodic input synchronization pulses. As such, the tank circuit produces a sinusoidal signal that is synchronized to the periodic synchronization pulses from the correlator. A threshold detector converts the sinusoidal signal into a pulsed output signal that is also synchronized to the input synchronization pulses. If the correlator intermittently produces pulses corresponding to false positive correlations, operation of the tank circuit is unaffected. Moreover, if the correlator subsequently ceases to produce input synchronization pulses, the tank circuit is designed such that the sinusoidal signal is slowly attenuated over time. Thus, for a pre-determined time period equivalent to a time constant of the tank circuit, the pulsed output signal from the threshold detector continues during temporary interruption of the input synchronization pulses. In this manner, transient loss of the input synchronization pulses does not effect the output signal of the flywheel circuit. Thus, a continuous series of pulses is produced by the flywheel circuit even though the input synchronization pulses from the correlator may be temporarily interrupted or intermittently aperiodic.

Unfortunately, this tank circuit-based flywheel circuit must be designed to resonate in response to a specific input synchronization pulse periodicity. Additionally, the duration during which the flywheel circuit is capable of producing pulses without an input signal is pre-established by the tank circuit resonance characteristics. As such, the circuit is designed with a specific application in mind and is not alterable without redesigning and physically altering the circuit.

Therefore, a need exists in the art for synchronous pulse generation circuits, and in particular, flywheel circuits that are flexible, i.e., they contain programmable parameters that govern the operation of the circuit. Such a programmable flywheel circuit would permit a single circuit design to be useful in many different applications. Additionally, such a circuit would permit the parameters to be altered during circuit operation such that the circuit can be dynamically optimized in view of present environmental characteristics such as transmission noise.

SUMMARY OF THE INVENTION

My invention advantageously overcomes the disadvantages heretofore associated with conventional pulse generation circuits that require a priori establishment of operational parameters. Specifically, through my invention, a correlator circuit derives timing pulses from a preamble in a digital signal, and a flywheel circuit synchronizes synchronization pulses produced by a pulse generator circuit to the timing pulses. Additionally, the flywheel circuit ensures that temporary drop-outs of the timing pulses do not affect the generation of synchronization pulses by the pulse generator circuit. The parameters by which the flywheel circuit operates are programmable. Thus, a single synchronous pulse generator design can be used in any number of applications without altering the physical implementation of the circuitry. Additionally, the parameters can be altered during operation of the circuit such that the circuit is optimized in view of present environmental characteristics such as variations in a signal-to-noise ratio of the digital signal.

Specifically, my inventive synchronous pulse generator contains a correlator circuit, a pulse generator circuit and a flywheel circuit. The correlator circuit is a conventional M out of N-bit preamble correlator which periodically generates timing pulses whenever M-bits in a received preamble match M out of N-bits in a pre-defined preamble pattern. Additionally, the pulse generator circuit periodically generates a synchronization pulse at a rate equivalent to an expected rate at which a preamble occurs. When synchronized, the timing pulses and synchronization pulses occur simultaneously. The flywheel circuit monitors the occurrence of the timing pulses from the correlator circuit relative to the occurrences of the synchronization pulses produced by the pulse generator circuit. Furthermore, the flywheel circuit resets the pulse generator circuit when the timing pulses are not synchronized with the synchronization pulses for a pre-defined period of time. Upon being reset, the pulse generator circuit synchronizes to the next occurring timing pulse from the correlator circuit.

In essence, the reset operation is a re-synchronization function.

In particular, the flywheel circuit contains an up/down counter that is loaded with a value, K, upon an initial occurrence of a timing pulse from the correlator circuit. Additionally, upon the occurrence of the initial timing pulse, the pulse generator circuit begins producing periodic synchronization pulses. The first of these synchronization pulses occurs simultaneous with the occurrence of the initial timing pulse. Subsequently, whenever a timing pulse and a synchronization pulse occur simultaneously, the up/down counter counts up by one. On the other hand, when the timing pulse and synchronization pulse do not occur simultaneously, the counter counts down by one. When the counter reaches a count of zero, the pulse generator circuit is reset upon the next occurrence of a timing pulse from the correlator circuit, i.e., the synchronization pulse is re-synchronized to the next timing pulse. Additionally, upon resetting the pulse generator, the up/down counter is again loaded with a count of K. Additionally, for each simultaneous occurrence of pulses, the counter is incremented by one until a count of L is attained. Thus, after a pre-defined period of synchronization, at least L non-simultaneous pulses need occur before the pulse generator circuit is reset. In this manner, the synchronous pulse generator produces at least L synchronization pulses during a transient loss of timing pulses before re-synchronization is attempted.

Moreover, the parameters K and L are programmable. As such, these values can be pre-established for a particular application of the synchronization pulse generator. Furthermore, if the particular application is altered, the values of K and L can easily be re-programmed to values that are appropriate for a new application. Alternatively, the values of K and L can be dynamically altered during operation of the pulse generation and timing synchronization circuit. Specifically, these values can be changed in response to measured changes in the received signal. For instance, when a channel is noisy, the value of K may be reduced to enable the generator to re-synchronize more often than occurs with a higher value of K. Also, in view of a noisy channel, the value of L can be increased to enable longer timing pulse drop-out periods to be withstood without causing re-synchronization.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in any system where a synchronization pulse is derived from a periodic preamble bit pattern contained in data. Typically, such systems include packet radio communications systems, digital communications systems using time division multiple access (TDMA) techniques, satellite communications systems, and high definition television (HDTV) receivers. Additionally, such systems may also include digital recording devices such as digital videotape recorders and digital audiotape recorders. In each of these systems, the signal, either recorded or transmitted by the system, contains a preamble bit pattern in addition to information carrying payload data. A synchronous pulse generator uses the preamble bit pattern, either upon playback or upon reception, to produce a series of synchronization pulses. These synchronization pulses are used to facilitate appropriate handling of the payload data, such as de-interleaving of the data, frame synchronization, system timing corrections, and the like. Nevertheless, for purposes of brevity and simplification, the following discussion will focus upon using my invention within a digital communications system, and specifically, within a receiver in such a system..

Figure 1:
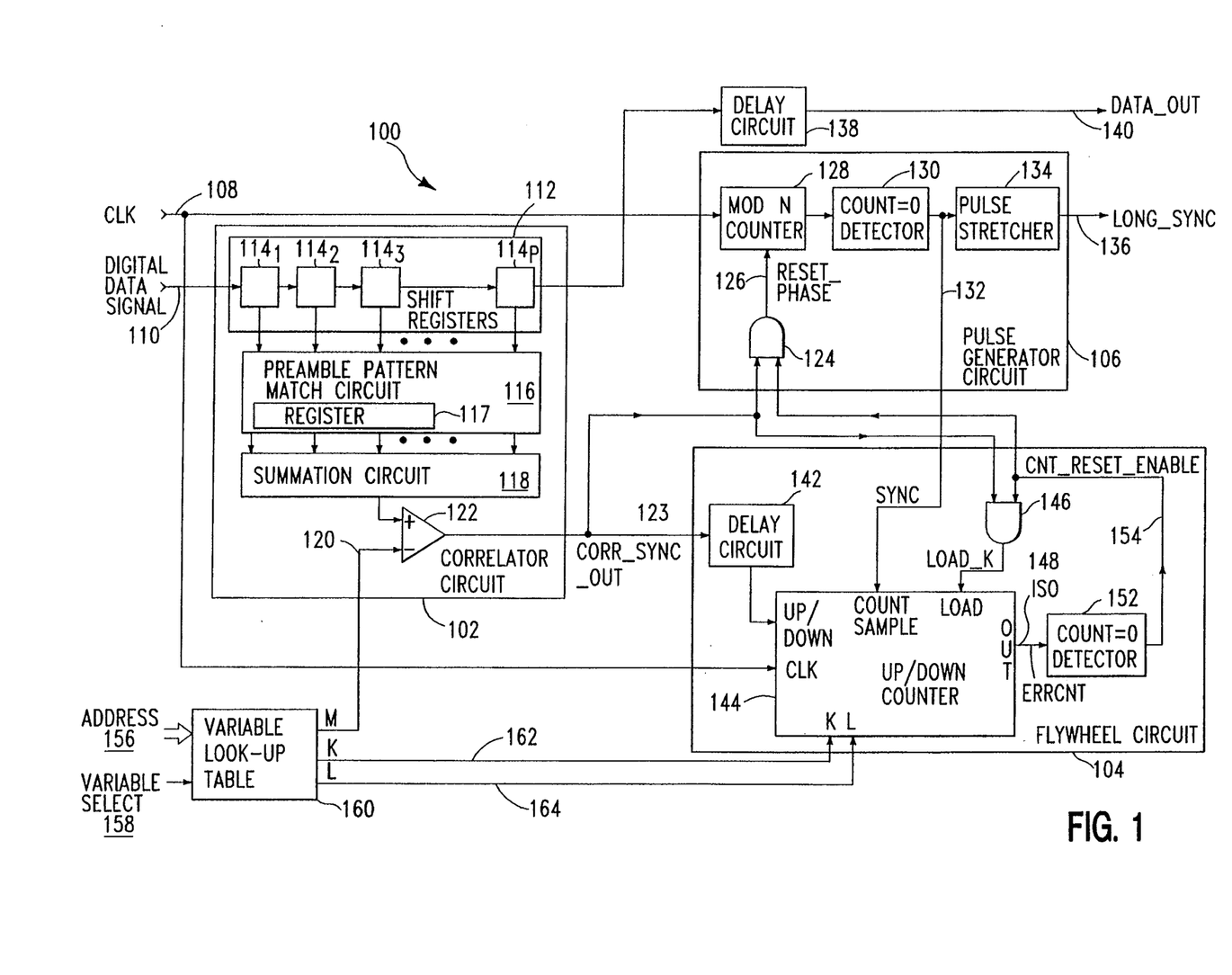
FIG. 1 shows a schematic diagram of my inventive synchronization pulse generator 100.

FIG. 1 depicts a block diagram of my inventive synchronous pulse generator 100. In general, the generator has, as an input signal, a digital data signal containing information carrying payload data and preamble bits that are periodically located between blocks of the payload data. The generator monitors the digital data signal for the periodic preamble bit pattern and, from this periodic preamble, generates a sequence of periodic synchronization pulses that is synchronized to the occurrences of the preamble pattern.

Specifically, synchronous pulse generator 100 contains correlator circuit 102., flywheel circuit 104, variable look-up table 160 and pulse generator circuit 106. Since my invention utilizes digital components within its various circuits, a digital clock signal (CLK) is provided on lead 108 as an input signal to generator 100. Additionally, the digital data signal, on lead 110, forms another input signal to generator 100. The data rate of the digital data signal is equivalent to the clock rate of the clock signal. Additionally, the clock and data signals are synchronous, i.e., bit synchronization is assumed to have been previously accomplished by other circuits within the receiver. The output signals of generator 100 are a data signal (DATA_OUT) on lead 140, and a series of synchronization pulses (LONG_SYNC) on lead 136. The specific nature of these signals is described in detail below.

Correlator circuit 102 contains shift register 112, preamble pattern match circuit 116, summation circuit 118 and threshold detector 122. In general, the correlator circuit is a so-called conventional M out of N correlator circuit, where M is a number of bits that must be correctly correlated to an N-bit preamble pattern to produce a signal (CORR_SYNC_OUT) indicating occurrence of a preamble correlation. To reduce possible confusion amongst variable values discussed herein, the length of the preamble is hereinafter indicated by the variable P, e.g., a P-bit preamble pattern.

Specifically, shift register 112 is a P-bit register containing individual one-bit registers $114_1$, $114_2$, $114_3$, . . . , $114_p$. This shift register shifts the data bits from one register to the next upon the occurrence of each clock signal transition. In this manner, after each clock cycle, P-bits of the data signal are compared to a P-bit preamble pattern stored in a register 117 in pattern match circuit 116. The pattern match circuit has P input leads each of which is connected to one of the P shift registers $114_1$, $114_2$, $114_3$, . . . , $114_p$. Additionally, the pattern match circuit has P output leads. The signal level on each output lead indicates when a value of a bit in a particular shift register matches a value of a correspondingly positioned bit in the preamble pattern. For each matched bit, pattern match circuit 116 generates a high level (one) on an output lead associated with that bit; otherwise, the output lead is maintained at a low level (zero). Summation circuit 118 sums the levels on its P input leads. As such, the output signal of the summation circuit varies from zero (no preamble bit correlations) to P (all of the preamble bits correlate). Comparator 122 compares the output signal of the summation circuit to a pre-defined threshold value (M). The threshold value is applied via lead 120 to the negative terminal of comparator 122; while the output signal from the summation circuit is applied to the positive terminal of the comparator. The value of M is a number of bits which must be correlated in the pattern match circuit to produce a timing pulse. When the output signal of the summation circuit is larger than M, the comparator generates a high level output; otherwise, the output is a low level. Consequently, when M out of P-bits correlate with the preamble bit pattern, correlator circuit 102 generates a high level timing pulse (CORR_SYNC_OUT) on lead 123.

Once the digital data signal has passed through correlator circuit 102, delay circuit 138 delays the data signal by a pre-established number of clock cycles, e.g., two clock cycles. Such a delay compensates for any processing time required by pulse generator circuit 106 and flywheel circuit 104 to produce a synchronization pulse. Consequently, this delay ensures that the synchronization pulse is aligned with the preamble pattern in the data signal. Typically, the delay circuit is implemented using one or more shift registers. However, those skilled in the art will realize that any one of many other circuit implementations can be used to effectuate such a delay. The delayed output of delay circuit 138 forms the DATA_OUT signal on lead 140. The DATA_OUT signal is subsequently processed by conventional receiver circuitry (not shown) to recover information within the data signal.

The CORR_SYNC_OUT signal forms an input signal to both flywheel circuit 104 and pulse generator circuit 106. In general, flywheel circuit 104 monitors the CORR_SYNC_OUT signal and synchronizes the synchronization pulses generated by pulse generator 106 to the CORR_SYNC_OUT signal.

To facilitate understanding, I will first discuss details of the pulse generator circuit followed by details of the flywheel circuit.

Specifically, pulse generator circuit 106 contains modulo N counter 128, zero count detector 130, pulse stretcher 134 and AND gate 124. The pulse generator circuit produces periodic timing pulses (LONG_SYNC) on lead 136, using modulo N counter 128, detector 130 and pulse stretcher 134. Specifically, the modulo N counter counts N clock pulses and then rolls over to zero. When a count of zero occurs, zero count detector 130 produces, on lead 132, a synchronization signal (SYNC), e.g., a high level signal lasting one clock cycle. The variable N is the number of bits in the preamble plus the number of bits of payload data between preambles. In other words, N is the number of bits which occurs between occurrences of the last bit in two consecutive preambles. In this manner, counter 128 in combination with detector 130 produces a synchronization signal (SYNC) at an ideal periodic rate for preamble correlation pulses ( CORR_SYNC_OUT). The ideal periodic rate is interrupted whenever counte[128 is reset by the signal labeled RESET_PHASE (discussed below), on lead 126. Upon reset, the modulo N counter is re-started at zero and the SYNC signal is thereafter produced at the ideal periodic rate for the correlation pulses.

The SYNC signal contains a sequence of high level pulses each having a duration of one clock cycle. Pulse stretcher 134 lengthens these pulses such that the LONG_SYNC signal has a duration that is equivalent to the length of the preamble pattern. As such, the LONG_SYNC signal has a dual purpose; one, as a timing synchronization pulse, and two, as a preamble pattern blanking pulse. Typically, the preamble pattern must be removed from the data signal to permit the payload data to be de-interleaved and/or further processed in some manner by other receiver circuitry. The LONG_SYNC signal can be used as a conventional blanking pulse to remove (blank) the preamble pattern from the data signal leaving only payload data for processing by the demodulator circuitry.

Alternatively, some applications may only need a timing synchronization pulse having a single clock cycle duration. For those applications, pulse stretcher 134 is not used and the SYNC signal forms an output of pulse generator circuit 106.

As previously mentioned, counter 128 repetitively counts to N and rolls over unless the counter is reset by the RESET_PHASE signal. This signal is produced when both input signals to AND gate 124 have a high level. One input to AND gate 124 is the CORR_SYNC_OUT signal from correlator circuit 102. The other input to AND gate 124 is the CNT_RESET_ENABLE signal from flywheel circuit 104. The process by which the CORR_SYNC_OUT signal is generated has been discussed above; the manner through which the CNT_RESET_ENABLE signal by flywheel circuit 104 will be discussed below.

In general, flywheel circuit 104 generates a confidence value that indicates a level of confidence as to whether the SYNC signal is synchronized with the CORR_SYNC_OUT signal. The confidence value is initially set to a value (K) and, from that value, the level of confidence either increases or decreases depending upon whether the pulses comprising the CORR_SYNC_OUT signal occur synchronously with the pulses in the SYNC signal. If the signals are not synchronized, i.e., the confidence value falls to zero, then, upon the next pulse in the CORR_SYNC_OUT signal, the modulo N counter in pulse generator circuit 106 is reset and the confidence value is reset to K. If, however, the SYNC signal and the CORR_SYNC_OUT signal are synchronous, then the confidence value incrementally increases to a pre-determined value (L). If, for some reason, the CORR_SYNC_OUT signal is lost after a period of synchronized operation, then the SYNC signal would be generated by the pulse generator circuit until a pre-defined time period had past, i.e., L times N clock cycles. After that time period, the confidence value would reach zero and, upon the next pulse in the CORR_SYNC_OUT signal, the modulo N counter is reset. In this manner, the pulse generator circuit produces synchronization pulses through transient losses in the CORR_SYNC_OUT signal. As such, as long as the duration of the transient loss is less than the present confidence value times N clock cycles, then the LONG_SYNC signal is not effected by transient drop-outs of pulses in the CORR_SYNC_OUT signal.

Specifically, flywheel circuit 104 contains delay circuit 142, AND gate 146, up/down counter 144, and zero count detector 152. The CORR_SYNC_OUT signal forms an input signal to delay circuit 142. The delay circuit delays the CORR_SYNC_OUT signal for a pre-determined number of clock cycles such that, when the SYNC signal and the CORR_SYNC_OUT signal are synchronized, both of these signals are simultaneously applied to up/down counter 144, i.e., the pulses comprising these two signals are applied to the counter during the same clock cycle. The delay duration established by delay circuit 142 is generally equivalent to the number of clock cycles required for the SYNC signal to be affected by an occurrence of the RESET_PHASE signal. Typically, this duration is two clock cycles. Conventionally, such a delay circuit is implemented using a series of shift registers. The number of shift registers is equivalent to the delay duration as measured in clock cycles. However, those skilled in the art will realize that there are many other ways of implementing a delay circuit.

Once delayed, the CORR_SYNC_OUT signal is applied to the up/down count terminal of up/down counter 144. When the up/down count terminal is at a high level, counter 144 counts up; otherwise, the counter counts down. Additionally, the SYNC signal is applied to the count enable terminal of up/down counter 144; the clock signal is applied to the clock terminal of the counter. Consequently, when the SYNC signal and the CORR_SYNC_OUT signal both have a high level, counter 144 counts up with each clock cycle. Since the SYNC and CORR_SYNC_OUT signals each have a duration of one clock cycle, the counter counts up by one for each simultaneous occurrence of these signals. Alternatively, if the SYNC signal attains a high level while the CORR_SYNC_OUT signal is at a low level, counter 144 counts down by one.

Counter 144 counts within a pre-defined range of zero and L. The specific count value at any moment in time can be considered a confidence level. The present count value is represented by an ERRCNT signal on lead 150. When the value of the ERRCNT SIGNAL reaches zero, i.e., indicating no confidence that the CORR_SYNC_OUT signal is synchronized with the SYNC signal, detector 152 generates a high level output signal, on lead 154. Detector 152 is a zero count detector which produces a high level output for each occurrence of a zero count on lead 150. The detector output signal forms the CNT_RESET_ENABLE signal which, in combination with the next occurring CORR_SYNC_OUT signal, resets modulo N counter 128. Additionally, the CNT_RESET_ENABLE signal is routed to one input of AND gate 146. The other input of AND gate 146 is the CORR_SYNC_OUT signal. As such, when the CNT_RESET_ENABLE signal is at a high level, i.e., when the confidence level is zero, the next occurrence of a pulse in the CORR_SYNC_OUT signal produces, on lead 148, a high level output signal (LOAD_K) from AND gate 146. The LOAD$_K$ signal loads a pre-determined count value K into counter 144. In essence, a pre-determined confidence level is loaded into the counter. As such, upon each subsequent occurrence of a pulse in the SYNC signal, counter 144 counts, depending upon the state of the CORR_SYNC_OUT signal, either up towards the value L or down towards zero. When a count of L is attained, the counter does not roll over, but rather maintains this count until synchronization is lost. At that time, the counter begins counting down from L towards zero with each pulse in the SYNC signal that does not simultaneously occur with a pulse on the CORR_SYNC_OUT signal. Since the SYNC signal is produced even though the CORR_SYNC_OUT signal is errant, transient loss of the CORR_SYNC_OUT signal does not affect generation of the SYNC signal.

Now, turning to the programmability aspect of my inventive synchronous pulse generator, generator 100 contains look-up table 160. The look-up table contains values for variables M, K and L that are addressable by digital address 156 and variable select signal 158. The address and variable select signals can either be generated by circuitry, e.g., a computer, (not shown) external to the receiver or another circuit within the receiver. For example, if an application for generator 100 requires pre-set values for M, K and L and those values will remain fixed during operation of the generator, then the values are typically set during manufacture. Variable select signal 158 sequentially selects variables M, K and L; address 156 selects a particular value for each variable from look-up table 160. Consequently, particular values of M, K and L respectively appear and are maintained on leads 120, 162 and 164.

On the other hand, if the values of M, K and L are to be dynamically altered during operation of the generator, circuitry within the receiver dynamically generates address 156 and variable select signal 158. For example, upon receiver start-up, selection circuitry (not shown) selects from the look-up table initial values of M, K and L as default values. Afterward, these default values are changed depending on certain operating characteristics of the receiver such as an estimated signal-to-noise ratio (SNR) of the received signal, a particular error rate from a forward error correcting circuit and the like. Illustratively, a circuit (not shown) may monitor an error rate of the digital payload data from a forward error correcting circuit. Upon this monitoring circuit sensing an particular error rate in the received data, the monitoring circuit alters the values of M, K and L to values that make the synchronous pulse generator increasingly robust in noisy environments, e.g., M and L are increased and K is decreased. In this manner, the operating parameters of the synchronization pulse generator can be dynamically optimized in view of changing environmental characteristics such as transmission noise, received signal strength and the like.

Figure 2:
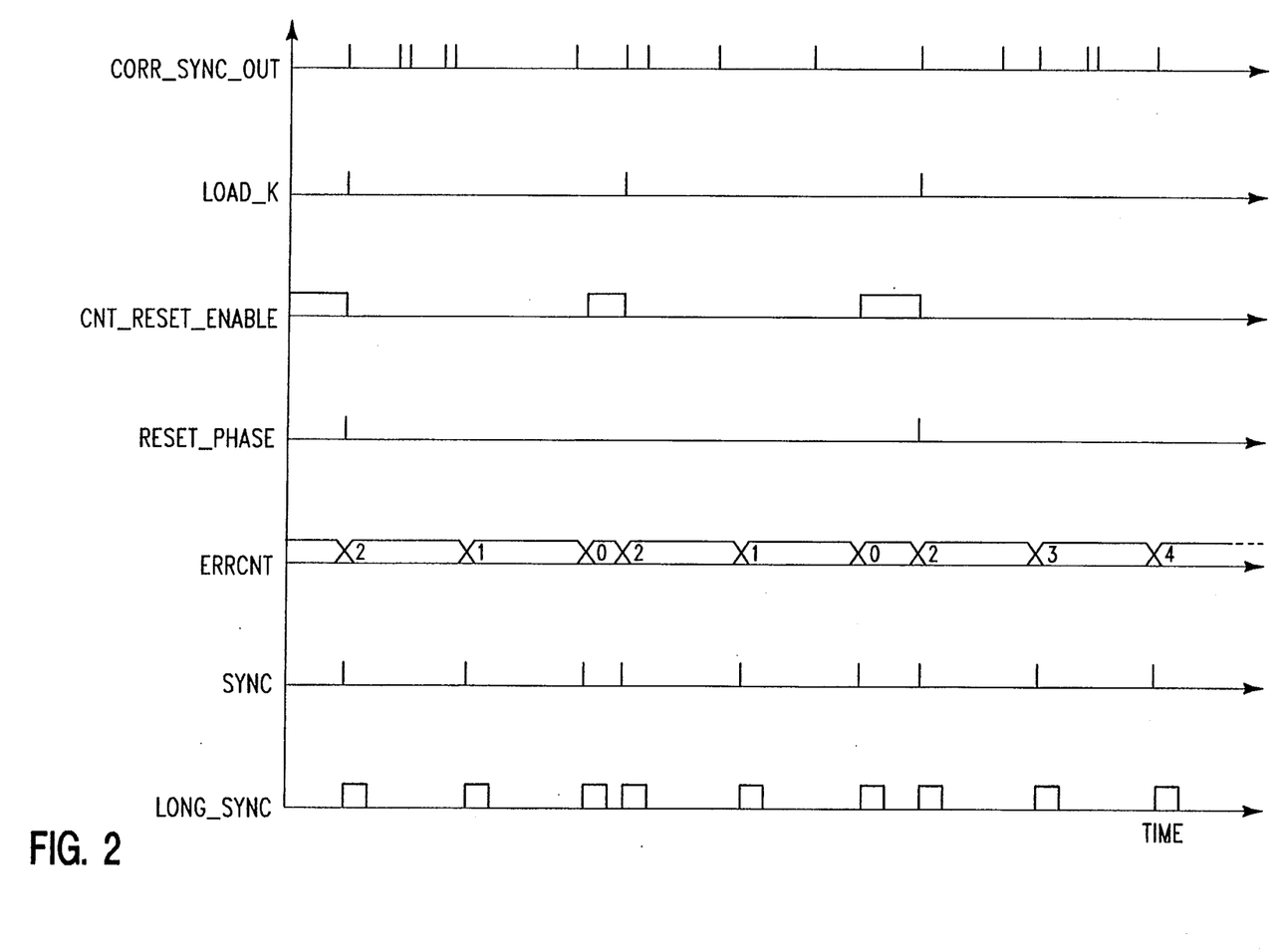
FIG. 2 depicts a timing diagram for generator 100 shown in FIG. 1.

To better understand the operation of synchronous pulse generator 100, FIG. 2 depicts a timing diagram for generator 100 depicted in FIG. 1. To best understand the signals and their interaction with one another, FIGS. 1 and 2 should be viewed simultaneously. To produce this timing diagram, the variables were set (fixed) as follows: L=7; K=2; P=24; and M=18.

Upon activating generator 100, up/down counter 144 has a count of zero. As such, the CNT_RESET_ENABLE signal has a high level. Upon the first pulse in the CORR_SYNC_OUT signal, the LOAD_K and the RESET_PHASE signals both attain a high level for one clock cycle. In response, counter 144 is loaded with a count of K, e.g., two, indicated as a numeral in the ERRCNT signal on the timing diagram. Additionally, modulo N counter 128 is reset to zero thus causing detector 130 to produce a SYNC signal pulse.

As shown in the timing diagram, the CORR_SYNC_OUT signal may contain a number of pulses between occurrences of SYNC pulses. These CORR_SYNC_OUT pulses are generally caused by false correlations due to transmission noise or payload data bits having a pattern that correlates with the preamble pattern. Since these pulses occur between SYNC pulses, the up/down counter is not enabled during their occurrence. Without the up/down counter disabled, the counter does not count and, consequently, these pulses have no effect upon the operation of generator 100.

After passage of N clock cycles, e.g., N being the number of bits in the transmission payload added to the number of bits in the preamble, a SYNC pulse is produced by the modulo N counter. However, a SYNC pulse is not depicted simultaneously occurring in the CORR_SYNC_OUT signal. Consequently, up/down counter 144 counts down by one, i.e., the ERRCNT signal is decremented by one. Upon the occurrence of the next SYNC pulse that is not simultaneous with a CORR_SYNC_OUT pulse, counter 144 again counts down to zero. A zero count causes the modulo N counter to be reset at the next occurrence of a CORR_SYNC_OUT pulse, and reloads the up/down counter with the value K (two).

Again, the SYNC signal is not synchronized with the CORR_SYNC_OUT signal. As such, the next three SYNC pulses cause the counter to count down to zero from two and, upon reaching zero, reset counter 128 and re-load counter 144.

After being reset, the next SYNC pulse occurs simultaneously with a CORR_SYNC_OUT pulse. As such, the up/down counter is incremented to a confidence level of three. For each subsequent simultaneous occurrence of these pulses, the counter counts up to a maximum value (L) of seven. Importantly, the false correlations shown in the CORR_SYNC_OUT signal occur between SYNC signal pulses and do not effect the synchronization of the SYNC signal to the correct CORR_SYNC_OUT pulses. Additionally, if a CORR_SYNC_OUT pulse were to be missing, i.e., transient noise caused more than M out of P preamble bits to be incorrect, then the SYNC pulse would be generated anyway and the up/down counter would be decremented by one. If a series of CORR_SYNC_OUT pulses were missing, the SYNC pulses would be generated until the confidence level reached zero. At that time, counter 128 would be reset and counter 144 would be re-loaded with the value K.

In this manner, the synchronization pulse generator synchronously generates timing pulses that are correlated to occurrences of a specific preamble bit pattern. Moreover, once synchronized, transient losses in preamble correlation and false correlations thereof do not effect the operation of the synchronous pulse generator. Additionally, by using programmable digital components to implement the invention, the invention permits the values of M, K, and L to be programmed into the generator such that these values can be selected to optimize performance of the generator in a specific application or dynamically selected during operation of the generator to optimize performance in view of present environmental characteristics.

Although one embodiment which incorporates the teachings of the present invention has been shown and described in detail herein, those skilled in the art can readily devise many other varied embodiments that still incorporate these teachings.

I claim:

1. Apparatus for generating periodic synchronization pulses from a pre-defined preamble bit pattern contained in a digital data signal, said apparatus comprising:

correlation means for correlating a pre-defined number of bits in said preamble bit pattern within the digital data signal to an expected preamble pattern and for producing a correlation signal when said pre-defined number of bits in said preamble bit pattern matches said expected preamble pattern, said correlation signal being susceptible to false positive or false negative preamble correlations;

pulse generator means, connected to said correlation means, for producing periodic synchronization pulses having a period equivalent to a period of occurrence of said preamble pattern;

flywheel means, connected to said pulse generator means and said correlation means, for synchronizing said periodic synchronization pulses to said correlation signal, wherein said flywheel means further comprises counter means for producing a count that increases when a pulse in said periodic synchronization pulses occurs simultaneously with a pulse in said correlation signal and decreases when a pulse in the periodic synchronization pulses occurs and a pulse in the correlation signal does not occur simultaneously therewith, wherein said flywheel means resets said pulse generator means when a pulse in the correlation signal is produced by said correlation means and the count of the counter has attained a pre-determined count value such that, through interaction of the flywheel means and the pulse generator means, the synchronization pulses only occur at the preamble pattern period and are not affected by either said false positive or said false negative preamble correlations.

2. The apparatus of claim 1 wherein said pre-determined count value is zero.

3. The apparatus of claim 1 wherein said pre-defined number of bits in said preamble bit pattern is less than a number of bits in said expected preamble bit pattern.

4. The apparatus of claim 1 wherein said pre-defined number of bits in said preamble bit pattern is equivalent to a number of bits in said expected preamble bit pattern.

5. The apparatus of claim 1 wherein said flywheel means further comprises means, connected to said counter means, for loading an initial count value into said counter means upon resetting said pulse generator means.

6. The apparatus of claim 5 wherein said counter means counts, after resetting said pulse generator means, up from said initial count value whenever said periodic synchronization pulses occur simultaneously with said correlation signal and counts, after resetting said pulse generator means, down from said initial count value whenever said periodic synchronization pulses do not occur simultaneously with said correlation signal.

7. The apparatus of claim 5 further comprising means for establishing and altering said initial count value.

8. The apparatus of claim 7 wherein said establishing and altering means is a look-up table containing a plurality of initial count values, each of which is individually selectable using a digital address.

9. The apparatus of claim 1 wherein said pulse generator means further comprises a modulo N counter for counting clock cycles of a clock signal from zero to N where N is the number of bits in said preamble pattern plus a number of bits in said data signal located between said preamble patterns, and a zero count detector, connected to said modulo N counter, for producing said periodic synchronization pulses whenever said modulo N counter has a count of zero.

10. The apparatus of claim 9 wherein said modulo N counter is reset to a count of zero whenever said counter means has a count of zero and a correlation signal is produced by said correlation means.

11. The apparatus of claim 10 wherein said pulse generator means further comprises a pulse stretcher, connected to said zero count detector, for producing, in response to said periodic synchronization pulses, elongated synchronization pulses having a pre-defined duration that is longer than a duration of an individual periodic synchronization pulse.

12. The apparatus of claim 11 wherein said duration of said elongated synchronization pulses is equivalent to a duration of said preamble pattern.

13. The apparatus of claim 1 wherein said correlation means further comprises:
a shift register for temporarily storing P-bits of the digital data signal, where P is an integer length in bits of the pre-defined preamble bit pattern;
pattern matching means, connected to said shift register, for matching said P-bits to said expected preamble pattern and for producing an indicating signal indicative of each bit out of said P-bits that matches said expected preamble pattern;
summation means, connected to said pattern matching means, for summing said indicating signals; and
comparison means, connected to said summation means, for comparing said summed indicating signal to a pre-defined threshold signal and for producing said correlation signal when said summed indicating signal exceeds said threshold signal.

14. The apparatus of claim 13 wherein a value of said summed indicating signal is indicative of a number of bits in said P-bits that match bits forming said expected preamble pattern.

15. The apparatus of claim 13 wherein said threshold signal represents a number of bits out of said P-bits that must match said bits of said expected preamble pattern before said correlation signal is generated.

16. The apparatus of claim 1 further comprising means for establishing and altering a maximum count value for said counter means.

17. The apparatus of claim 16 wherein said establishing and altering means is a look-up table containing a plurality of maximum count values, each of which is individually selectable using a digital address.

18. The apparatus of claim 1 wherein said pre-defined number of bits in said preamble bit pattern that must correlate with said expected preamble pattern before producing said correlation signal is a correlation threshold value and further comprising means for establishing and altering said correlation threshold value.

19. The apparatus of claim 18 wherein said establishing and altering means is a look-up table containing a plurality of correlation threshold values, each of which is individually selectable using a digital address.

20. A method for producing periodic synchronization pulses that are derived from a preamble bit pattern contained in a digital data signal, said method comprising the steps of:
correlating a pre-defined number of bits in said preamble bit pattern within the digital data signal with an expected preamble pattern;
generating a correlation signal when said pre-defined number of bits in said preamble bit pattern matches said expected preamble pattern, said correlation signal being susceptible to false positive or false negative preamble correlations;
producing said periodic synchronization pulses having a period equivalent to a period of occurrence of said preamble pattern;
synchronizing said periodic synchronization pulses to said correlation signal by providing a counter for producing a count that increases when a pulse in said periodic synchronization pulses occurs simultaneously with a pulse in said correlation signal and decreases when a pulse in the periodic synchronization pulses occurs and a pulse in the correlation signal does not occur simultaneously therewith, and by re-starting said production of said periodic synchronization pulses when a pulse in the correlation signal is produced and a count value of the counter has attained a pre-determined count value such that the synchronization pulses only occur at the preamble pattern period and are not affected by either said false positive or said false negative preamble correlations.

21. The method of claim 20 wherein said pre-determined count value is zero.

22. The method of claim 20 wherein said pre-determined number of bits in said preamble bit pattern is less than a number of bits in said expected preamble bit pattern.

23. The methods of claim 20 wherein said pre-defined number of bits in said preamble bit pattern is equivalent to a number of bits in said expected preamble bit pattern.

24. The method of claim 20 wherein said synchronizing step further comprises the step of loading an initial count value into said counter upon restarting said production of said periodic synchronization pulses.

25. The method of claim 24 wherein said counter counts, after restarting said production of said periodic synchronization pulses, up from said initial count value whenever said periodic synchronization pulses occur simultaneously with said correlation signal and counts, after restarting said production of said periodic synchronization pulses, down from said initial count value whenever said periodic synchronization pulses do not occur simultaneously with said correlation signal.

26. The method of claim 24 wherein said synchronizing step further comprises the step of establishing said initial count value.

27. The method of claim 26 wherein said establishing step further comprises the steps of storing in a look-up table a plurality of initial count values and selecting an initial count value from said plurality of initial count values using a digital address.

28. The method of claim 20 wherein said producing step further comprises the steps of counting clock cycles of a clock signal from zero to N where N is the number of bits in said preamble pattern plus a number of bits in said data signal located between said preamble patterns, and producing a periodic synchronization pulse whenever said clock cycle count attains a count of zero.

29. The method of claim 28 wherein said clock cycle counting step further comprises the step of resetting said count to zero whenever said counter has a count of zero and a correlation signal is produced.

30. The method of claim 29 wherein said producing step further comprises the step of producing, in response to each periodic synchronization pulse, an elongated synchronization pulse having a pre-defined duration that is longer than a duration of said periodic synchronization pulse.

31. The method of claim 30 wherein said duration of said elongated synchronization pulse is equivalent to a duration of said preamble pattern.

32. The method of claim 20 wherein said correlating step further comprises the steps of:

temporarily storing P-bits of the digital data signal, where P is an integer length in bits of the pre-defined preamble bit pattern;

matching said P-bits to said expected preamble pattern and producing an indicating signal indicative of each bit out of said P-bits that matches said expected preamble pattern;

summing said indicating signals;

comparing said summed indicating signal to a pre-defined threshold signal; and producing said correlation signal when said summed indicating signal exceeds said threshold signal.

33. The method of claim 32 wherein a value of said summed indicating signal is indicative of a number of bits in said P-bits that match bits forming said expected preamble pattern.

34. The method of claim 33 wherein said threshold signal represents a number of bits out of said P-bits that must match before generating said correlation signal.

35. The method of claim 20 further comprising the steps of establishing a maximum count value for said counter.

36. The method of claim 35 wherein said establishing step further comprises the steps of storing a look-up table a plurality of maximum count values and selecting a maximum count value from said plurality of maximum count values using a digital address.

37. The method of claim 20 wherein said pre-defined number of bits in said preamble bit pattern that must correlate with said expected preamble pattern before producing said correlation signal is a correlation threshold value and further comprising the step of establishing said correlation threshold value.

38. The method of claim 37 wherein said establishing step further comprises the steps of storing in a look-up table a plurality of correlation threshold values and selecting a correlation threshold value from said plurality of correlation threshold values using a digital address.

* * * * *